Sept. 8, 1959    P. R. WEAVER    2,903,533
SELF-LATCHING OMNIDIRECTIONAL ACCELERATION SWITCH
Filed April 16, 1957    4 Sheets-Sheet 1

INVENTOR.
PRESTON R. WEAVER
BY
Moses, Nolte & Nolte
ATTORNEYS

Sept. 8, 1959 P. R. WEAVER 2,903,533
SELF-LATCHING OMNIDIRECTIONAL ACCELERATION SWITCH
Filed April 16, 1957 4 Sheets-Sheet 2
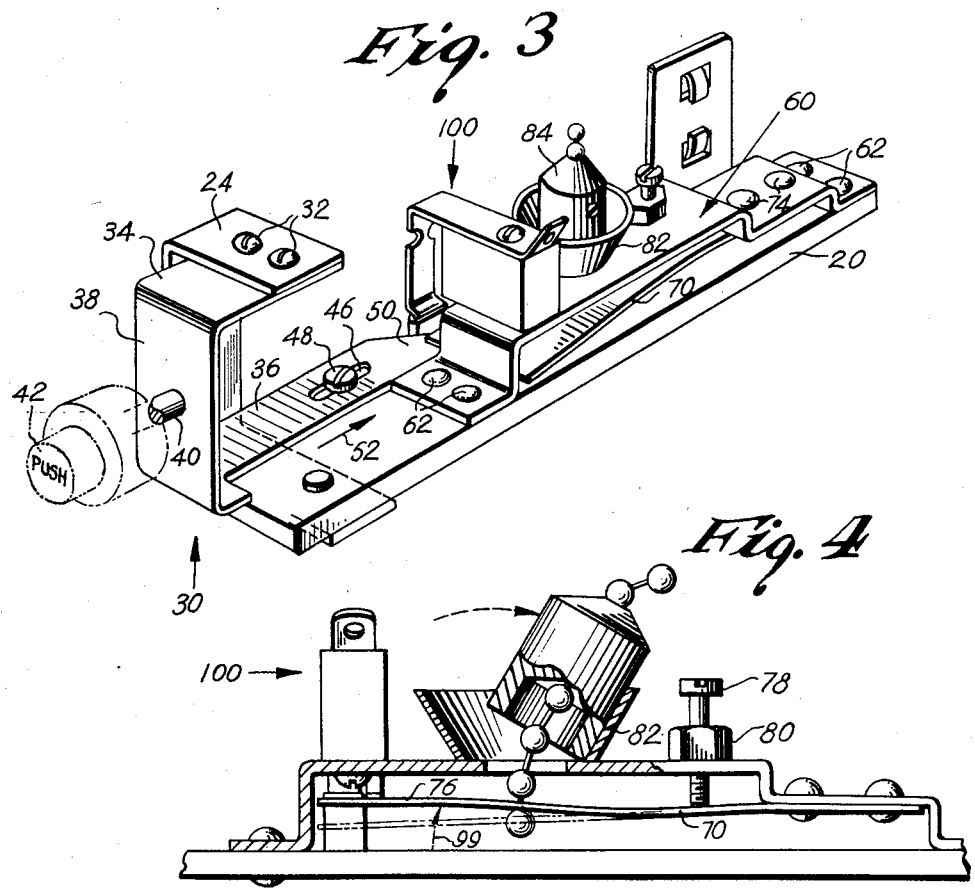
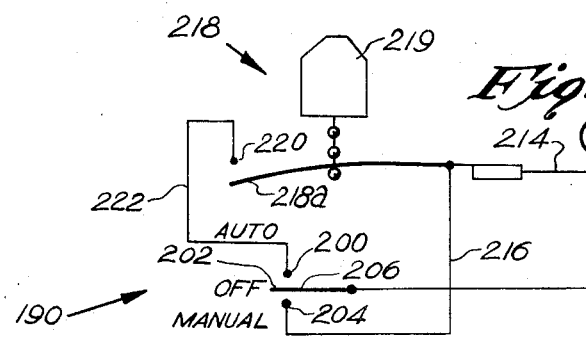
INVENTOR.
PRESTON R. WEAVER
BY
Moses, Nolte & Nolte
ATTORNEYS Sept. 8, 1959 P. R. WEAVER 2,903,533
SELF-LATCHING OMNIDIRECTIONAL ACCELERATION SWITCH
Filed April 16, 1957 4 Sheets-Sheet 3
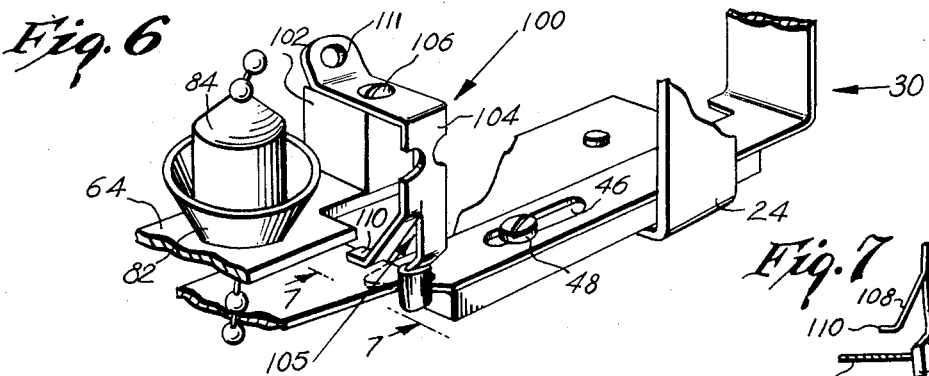
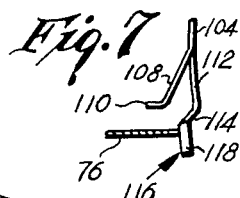
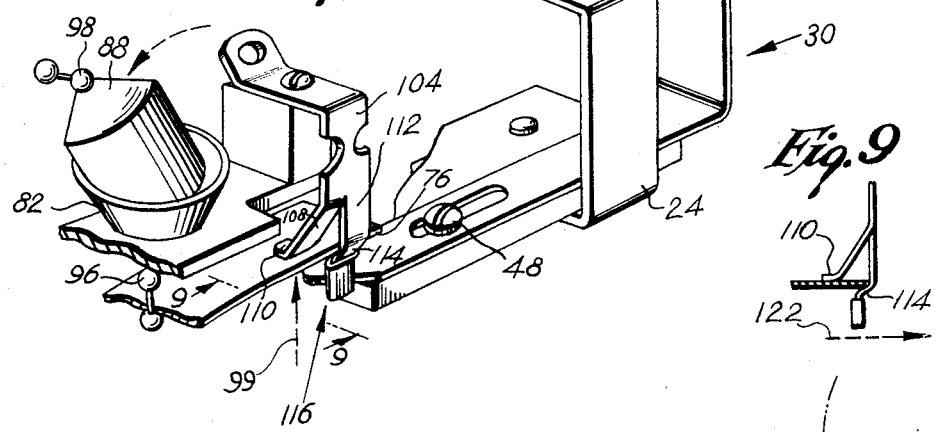
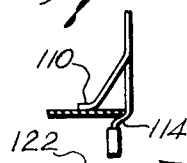
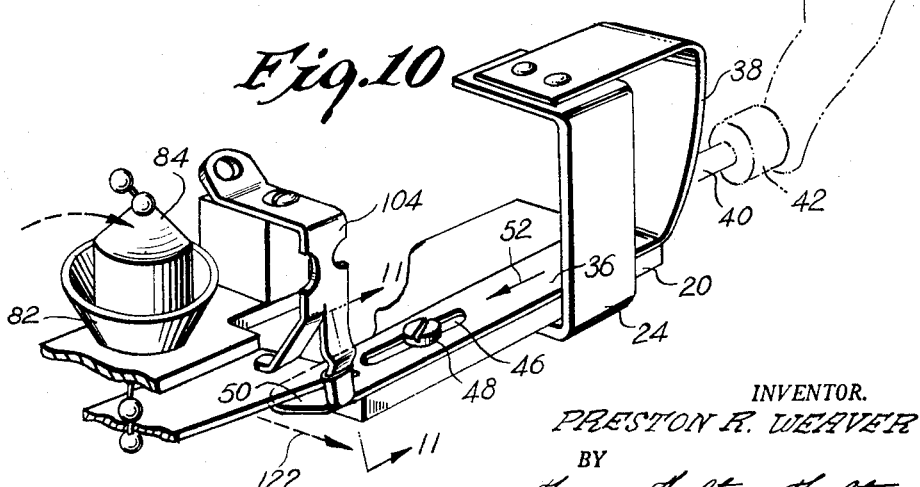
INVENTOR.
PRESTON R. WEAVER
BY
Moses, Nolte & Nolte
ATTORNEYS Sept. 8, 1959  P. R. WEAVER  2,903,533
SELF-LATCHING OMNIDIRECTIONAL ACCELERATION SWITCH
Filed April 16, 1957  4 Sheets-Sheet 4
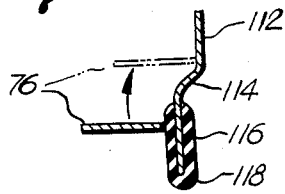
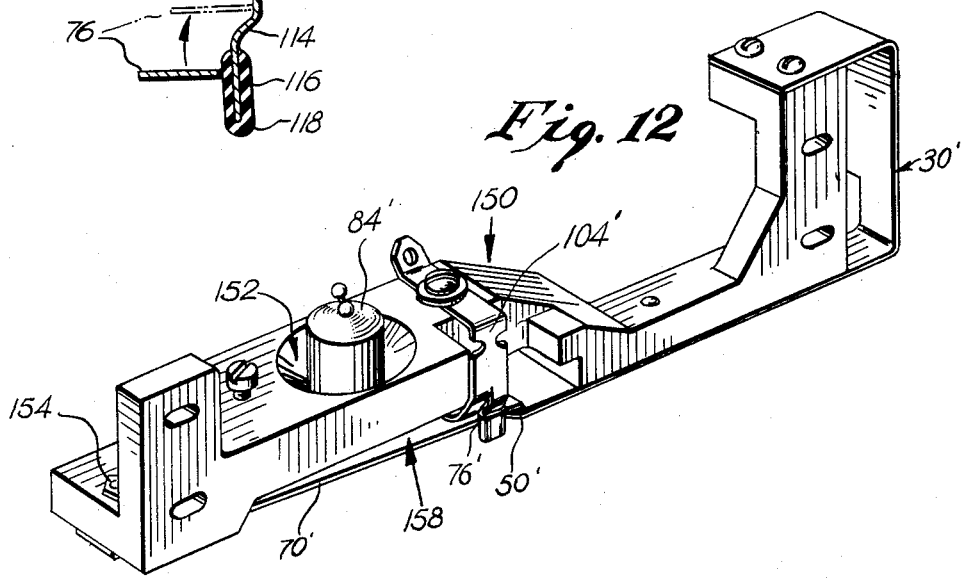
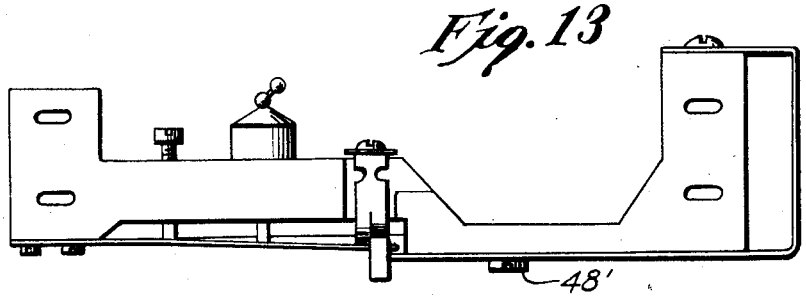
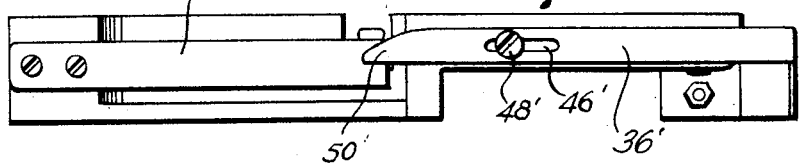
INVENTOR.
PRESTON R. WEAVER
BY
Moser, Nolte & Nolte
ATTORNEYS United States Patent Office 2,903,533
Patented Sept. 8, 1959

2,903,533

SELF-LATCHING OMNIDIRECTIONAL ACCELERATION SWITCH

Preston R. Weaver, Nyack, N.Y., assignor to The W. L. Maxson Corporation, New York, N.Y., a corporation of New York Application April 16, 1957, Serial No. 653,215

14 Claims. (Cl. 200—61.5)

This invention relates to a self-latching omnidirectional acceleration switch.

The main object of my invention is to provide a self-latching omnidirectional acceleration switch which is operable to close a given circuit upon the switch being subjected to a pre-determined acceleration or amplitude of vibration in any direction, without manually operating the switch.

Another object of my invention is to provide a self-latching omnidirectional acceleration switch which is manually adjustable for response to selected ranges of vibration and acceleration.

A further object of this invention is to have such a self-latching omnidirectional acceleration switch that is capable of being manually re-settable for repeat operation after having operated in response to a pre-determined vibration or acceleration.

It is an important objective of my invention to have such an acceleration switch which is not only adjustable and manually resettable for further operation, but accurate and reliable in adjustment and also certain to operate as expected.

A practical object of the invention is to have such an acceleration switch that is ready, compact and reasonably light so that the aircraft upon which it is mounted cannot be seriously burdened or have its performance altered thereby.

It is still another object of this invention to have an acceleration switch of the character indicated which will, in response to a pre-determined acceleration or amplitude of vibration, act to close a circuit such as to turn on lights or other safety apparatus in the event of aircraft crash emergencies.

Other objects and advantages of my invention will appear more fully in detail as the specification proceeds.

In order to facilitate ready comprehension of this invention and for a proper appreciation of the salient features thereof, the invention is illustrated in the accompanying drawings forming a part thereof, in which:

Fig. 3 is a perspective view partly in section of the omnidirectional self-latching acceleration switch without a casing;

Fig. 4 is a fragmentary side view partly in section of the invention as illustrated in Fig. 3;

Fig. 5 is a circuit schematic illustration of the application of the switch of the present invention to an emergency crash lighting system of an aircraft;

Fig. 6 is a fragmentary perspective view partly in section of the invention as illustrated in Fig. 3;

Fig. 7 is a fragmentary sectional view taken along the line 7—7 of Fig. 6;

Fig. 8 is a fragmentary perspective view partly in section showing the invention after initial operation has taken place;

Fig. 9 is a sectional view taken along the line 9—9 of Fig. 8;

Fig. 10 is a fragmentary perspective view showing the invention as illustrated in Fig. 8 after resetting of the switch;

Fig. 11 is a partial sectional view taken along the line 11—11 of Fig. 10;

Fig. 12 is a perspective view of a modification of the invention;

Fig. 13 is a side elevation of the invention as illustrated in Fig. 12;

Fig. 14 is a bottom view of the invention as illustrated in Fig. 12.

In the views the same reference numerals indicate the same part throughout.

In aircraft, it is often important that in response to emergency conditions caused by excessive acceleration or deceleration of the aircraft, i.e., as in crashing or in contact with other obstructions, that emergency lights or other safety apparatus be automatically turned on. In order to cause such effect, I propose to initiate operation of such emergency features by the installation of an omnidirectional self-latching acceleration switch, which in response to a pre-determined vibration or acceleration of given magnitude, will automatically operate to close a circuit causing the desired action. It is of course important, that such a switch be easily adjustable in order to select the acceleration or vibration at which it will operate and that such a switch further be capable of being reset for further operation.

In order to embody the features and advantages outlined above, I have produced a special acceleration switch which will now be described in detail.

Figure 1:
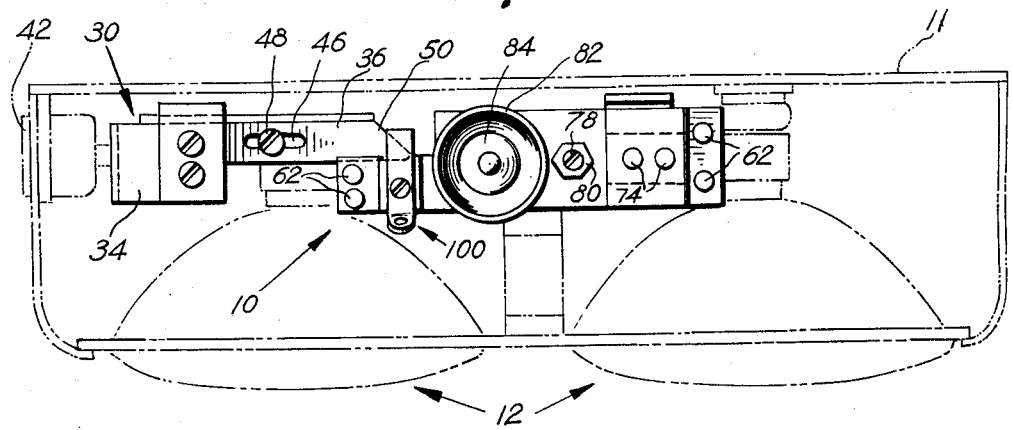
Fig. 1 is a top view of an omnidirectional self-latching acceleration switch made according to the invention illustrated for use in connection with a conventional aircraft crash lighting system.
Figure 2:
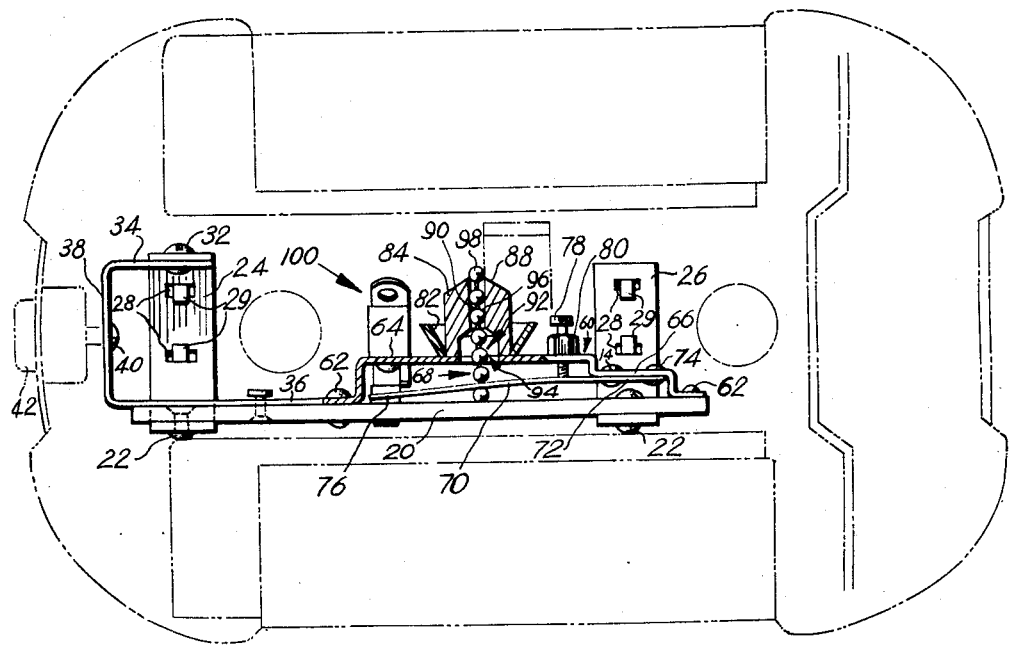
Fig. 2 is a front view taken of the invention as illustrated in Fig. 1.

The invention embodied in Figs. 1 through 3, inclusive, illustrates a self-latching omnidirectional acceleration switch 10 mounted in a casing 11 for emergency crash lights 12.

The switch base 20, made of insulating board or other suitable insulating material, has mounted on its extremities, by rivets 22, a pair of brackets 24 and 26. Bracket 24 is substantially U-shaped with its upper end extending over base 20 and bracket 26 is substantially L-shaped. A plurality of openings 28 are provided in these brackets to allow mounting of the brackets, by conventional means, to a selected wall of the switch casing 11. In the embodiment illustrated, this mounting is accomplished by clamp strips 29 which extend through the openings 28.

A substantially U-shaped resilient reset member 30 is provided to manually reset the switch after operation. The upper portion 34 of reset member 30 is mounted to bracket 24 by rivets 32 (Fig. 2). The lower portion 36 of reset member 30 extends longitudinally over and substantially parallel to base 20.

The intermediate portion 38 of reset member 30 has mounted thereon a connecting rod 40 or other suitable connecting means engaging reset button 42, to allow pressure to be applied from reset button 42 to said intermediate portion. Pressure on intermediate portion 38 causes lower portion 36 of member 30 to move substantially in the direction of arrow 52 (Fig. 3) when resetting of the switch is desired after operation. This will be hereinafter described in more complete detail.

A key slot 46 is provided in the lower portion or extension 36 of member 30 and a screw 48 or other suitable guide means, extends therethrough into base 20 to maintain extension 36 in alignment with the switch during the reset operation. The extremity of extension 36 is tapered at 50 (Fig. 3), for a purpose to be hereinafter described.

Reset member 30 is formed of resilient material so that the pressure on its intermediate portion 38 will cause extension 36 to move longitudinally in the direction of arrow 52, guided by the screw 48 in slot 46. It is also necessary that member 30 be resilient, in order that after the removal of pressure, member 30 will return to its original position automatically, without further manual operation.

At the opposite end of base 20 from reset member 30, and extending toward reset member 30, is mounted a conductive bracket 60 by means of rivet 62 (Fig. 2). This bracket is formed in two steps, the higher step 64 being at the end nearest reset member 30 and its tapered extension 50, and the lower step 66 being in proximity to the plane of bracket 26.

Suspended in the open area 68, defined between bracket 60 and switch base 20, is resilient leaf spring 70 extending longitudinally of, but not in contact with base 20. One end 72 of this leaf spring 70 is soldered, by suitable means, to the underside of lower step 66, of bracket 60. This connection also secures upwardly protruding lugs 74 which form one terminal contact end for the attachment of suitable conductive wires, it being well understood that spring 70 could be attached by any suitable conductive means to bracket 60, without departing from the spirit of this invention.

Free end 76 of leaf spring 70, extends toward and over, but not in contact with the tapered extension 50 of portion 36 of reset member 30.

An adjusting screw 78 extends downwardly through a securing hub 80, on the upper step 64 of bracket 60, to select and maintain the desired operating pressure on spring 70, so that spring 70 will be held slightly depressed for a purpose to be hereinafter described.

At a point intermediate of upper step 64 of bracket 60, is a cup-shaped inertia mass retaining saucer 82. The side walls of this saucer flare upwardly and outwardly. However, at the point where the saucer is mounted on bracket step 64 by solder or other conventional means, the saucer diameter is substantially equal to the diameter of its contained inertia mass 84. The mass illustrated is cylindrical in shape about its base 86 and has a conically formed upper portion 88.

Mass 84 has a channel 90 extending along its vertical axis and an enlarged cylindrical cut out portion 92 at its base. Bracket 66 has an opening 94 therethrough, coincident to the cut out portion 92, when the mass is seated on bracket 60.

A chain 96 extends through channel 90, cut out portion 92, and opening 94 and is fixedly mounted to the intermediate portion of spring 70 beneath the lower side of bracket 60. The upper extremity 98 (Figs. 2 and 8) of chain 96 is fixedly mounted at the apex of the conical extension 88 of mass 84. It is therefore seen that a tilting or twisting of the mass 84, as illustrated in Fig. 4, will cause free end 76 of leaf spring 70 to be raised substantially in the direction of arrow 99 of Figs. 4 and 8. The adjustment of the screw 78 allows a pre-loading of the leaf spring 70 so as to determined the amount of force or energy that will be required by acceleration or vibration to cause the resulting snap action of leaf member 70. The walls of saucer 82 prevent the mass from falling over completely and the chain 96 is only of sufficient length to allow the desired movement of mass 84.

When the inertia mass 84 has returned from the position indicated in Fig. 4, to the position indicated in Fig. 3, and after the switch has been operated, the switch is self-locked, by means to be hereinafter described, so that the extremity 76 of leaf spring 70 will remain in its raised position as shown in Fig. 4. This causes the switch to remain closed until reset by the reset member 30 as will be hereinafter described.

It is well understood that any suitable pliable connecting means other than chain 96 could be used to connect the inertia mass 84 with the leaf spring 70 to provide the operation hereinabove described without departing from the spirit of this invention.

A latch and contact assembly generally indicated at 100 Figs. 2, 4 and 6 through 11 inclusive, is provided to supply the contact means which close the circuit upon movement of spring member 70 in the direction of arrow 99, Fig. 4 and to hold this spring member 76 in its raised position after operation, until it is manually reset.

This latch and contact assembly includes an insulating block 102 having supported thereon, an L-shaped latch and contact spring member 104. This assembly rests on upper bracket step 64 at the end nearest to reset member 30 and is securely fastened to bracket 64 by means of a screw 106 (Fig. 6).

Latch and contact spring member 104 is split at 105, (Fig. 6) on its downwardly extending end so that one portion 108 is bent over the free end 76 of leaf spring 70 to form contact shoe 110. This is the contact shoe which results in the circuits being closed upon operation of leaf spring 70, which was hereinabove described. Suitable lugs or other connecting means are provided at the top portion 111 of spring 104 to form the second terminal for the switch.

The other split portion 112 of member 104 extends down and around the extremity of free end 76 of leaf spring 70 and is notched at 114 (Fig. 7). The extremity 116 of portion 112, which extends below notch 114, is insulated by padding, paint or other insulation material at 118. (Fig. 11). This is necessary so that when the free end 76 of leaf spring 70 is in contact with this extending portion 116, the circuit will not be closed. This is necessary since the leaf spring 76 is fully conductive at all times as is likewise member 104.

Before operation the free end 76 of leaf spring 70, forced downwardly under the action of adjusting screw 78, engages the non-conductive downward extension 116 of member 104, and is not in contact with shoe 110 (Fig. 7). Spring 70 is held in this downward position by its own spring tension.

When in response to a predetermined acceleration or vibration of a predetermined amplitude, the inertia mass 84 is tipped or tilted in any direction to a position substantially as shown in Figs. 4 or 8, chain 96 will pull upwardly on spring 70 and causes free end 76 of the spring to snap upwardly in the direction of arrow 99, Fig. 8. Free end 76 will then engage contact shoe 110 and will be locked in engagement with the contact shoe 110 by notch 114 as shown in Fig. 9.

The inertia mass 84 after this acceleration or vibration has ceased, will return under the action of its own weight, to a position as shown in Figs. 1, 2, 3, 6 or 10. However, the contact shoe 110 will remain locked in engagement with the conductive free end 76 of leaf spring 70, until manual resetting is accomplished.

Resetting is accomplished by pressure on reset button 42 which causes the lower extension 36 of reset member 30 to move laterally in the direction of arrow 52, Figs. 3 and 10 as hereinabove described.

Referring to Fig. 10, it is seen that the lateral movement of extension 36 causes the extension 116 of spring 104 to move outwardly in the direction of arrow 122, Figs. 9 and 10 under the camming action of the tapered end 50 of extension 36.

The free end 76 of leaf spring 70 is then freed from notch 114 and will return to its normal position out of contact with the contact shoe 110 under its own spring tension to be ready for re-cycling. Reset member 30 and tapered extension 50, likewise return to their normal position as hereinabove described, after release of pressure to be ready to reset the switch on subsequent operation.

In the modification shown in the Figs. 12, 13 and 14, all of the parts having like functions as those hereinabove described for Figs. 1 through 11 are indicated with like numerals with a prime added.

All of the operating parts are identical, with the exception that the base 20, brackets 24, 26, the bracket 60 of Figs. 1 through 11, insulating block 102 and retaining saucer 82, have been combined so as to form a one-piece insulated body member 150. The spring reset member 30' is mounted to the body member 150 substantially as hereinabove described for reset member 30 and has its tapered extension 50' extending parallel to and below body member 150 to perform reset as hereinabove set forth.

Latch and contact spring member 104' likewise functions in cooperation with leaf spring member 70', free end 76' of spring 70' and tapered extension 50' in an identical manner to that indicated above for the corresponding components in Figs. 1 through 11, inclusive.

In the place of the retaining saucer 82 illustrated in Figs. 1 through 10, inclusive, the modification of Figs. 12 through 14 has a bowl recess 152 formed in the top of base member 150. This recess allows for the movement of the inertia mass 84' in an identical manner as that set forth for the mass 84 in Figs. 1 through 10. Contacts 154, only one shown, function in the same manner as does the contact lugs 74 (Fig. 3) in that they form one terminal of the device.

In this modification the leaf spring 70' is mounted to the underside of base 150 which is recessed at 158 to allow freedom of movement for spring 70' and the guide screw 48' extends through the key hole slot 46' in extension 36' of reset member 30' on the underside of base member 150.

Fig. 5 shows a schematic diagram of the application of the omnidirectional acceleration switch to an aircraft emergency lighting system.

There is provided a selecting switch generally indicated at 190 including an Automatic contact 200, an Off position 202 and a Manual contact 204.

Placing moveable contact 206 in engagement with Manual contact 204 will close the circuit to the lights 208, 210 through lines 212, 214 and 216 without employing the omnidirectional switch indicated generally at 218.

If the moveable contact 206 is left in the Off position 202 then the lights 208—210 would be inoperative under all conditions.

However, if the moveable contact 206 is placed in engagement with Automatic contact 200, manually or by any means then operation of the lights 208—210 will be dependent upon the action of the omnidirectional switch 218. The circuit in this instance being closed under the action of mass 219 by the engagement of moveable contact 218a with the stationary contact 220 and thence through lines 212, 214, 222.

It is understood that these latter components 220, 218a, 219 correspond to the contact shoe 110, free end 76 of leaf spring 70 and mass 84 of Figs. 1–11 inclusive, respectively, as hereinabove described.

I have described what I believe to be the best embodiments of my invention. I do not wish however, to be confined to the embodiments shown, but what I desire to cover by Letters Patent is set forth in the appended claims.

I claim:

1. A self-latching omnidirectional acceleration switch including a base member, a resilient conductive spring member having a fixed end and a free end, means for mounting the fixed end of said spring member in relation to said base member whereby the free end of said spring member will not contact said base member during switch operation, contact means mounted on said base member above the free end of said spring member, switch actuating means acting in response to a predetermined acceleration or vibration in substantially any direction adapted to force the free end of said spring member to engage said contact means whereby the circuit is closed, means to lock said free end of said spring member to said contact means, means to manually reset said spring member after operation so that it will be disengaged from said contact means and means to adjust said spring member so that it will respond to a pre-selected acceleration or vibration of a predetermined magnitude.

2. A self-latching omnidirectional acceleration switch including a base member, a resilient conductive spring member having a fixed end and a free end, means for mounting the fixed end of said spring member in relation to said base member whereby the free end of said spring member will not contact said base member during switch operation, contact means mounted on said base member above the free end of said spring member, switch actuating means acting in response to a predetermined acceleration or vibration in substantially any direction adapted to force the free end of said spring member to engage said contact means whereby the circuit is closed, means to lock said free end of said spring member to said contact means, means to manually reset said spring member after operation so that it will be disengaged from said contact means, and means to adjust said spring member so that it will respond to a pre-selected acceleration or vibration of a predetermined magnitude, wherein said resetting means includes a U-shaped resilient reset member, means for mounting said reset member on said switch base, said reset member having a lower extremity extending substantially parallel to said switch base in a direction toward said free end of said spring member, said lower extending portion having a tapered extremity, guide means on said base member adapted to maintain the movement of said lower extending portion in substantially a straight line and means for exerting pressure on said rest member whereby said lower extending portion will be moved in a direction towards said free end of said spring member.

3. An omnidirectional acceleration switch as in claim 2, wherein said contact means includes an L-shaped conductive latch member having a downwardly extending portion, said downwardly extending portion being split at a point intermediate its length, one of the said split portions being bent over the free end of said conductive spring member to form a contact shoe, said contact shoe being normally out of engagement with the free end of said resilient conductive spring member, the other split portion of said downwardly extending latch member portion including the locking means.

4. A self-latching omnidirectional acceleration switch as in claim 3, wherein said locking means includes a notch in said other split portion of the latch member at a point intermediate its length adapted to lock said free end of said resilient spring member into engagement with said contact shoe after the actuation of said switch actuating means.

5. A self-latching omnidirectional acceleration switch as in claim 4, wherein said switch actuating means includes an inertia mass, means connecting said inertia mass to said spring member and inertia mass retaining means allowing omnidirectional movement of said mass whereby the switch will respond to a vibration in any direction, said inertia mass retaining means restricting movement of said inertia mass whereby the mass will be returned to its substantially normally vertical position after the actuating acceleration or vibration has ceased.

6. A self-latching omnidirectional acceleration switch as in claim 5, wherein said inertia mass is cylindrical in conformation about its base and has a conically formed upper portion, said connecting means including a chain connecting said inertia mass with the intermediate portion of said spring member and said contact means including an insulated contact block adapted to maintain said L-shaped latch member out of engagement from said mounting bracket.

7. A self-latching omnidirectional acceleration switch as in claim 6, wherein said mounting means includes a conductive bracket mounted on said base member, said fixed end of said spring member being fixedly mounted to extend longitudinally into the opening defined between said bracket and said base portion of said switch, said inertia mass retaining means including an inertia mass retaining saucer.

8. A self-latching omnidirectional acceleration switch as in claim 7, wherein said bracket includes an upper step and a lower step, said fixed end of said spring member being mounted on the underside of said lower step and said inertia mass retaining saucer being mounted on the upper side of said upper step.

9. A self-latching omnidirectional acceleration switch as in claim 7, wherein said adjusting means includes a nut mounted on the upper step of said bracket and an adjusting screw extending through said nut contacting said spring member adapted to select the magnitude of acceleration or vibration to actuate the switch.

10. A self-latching omnidirectional acceleration switch as in claim 9, wherein the extremity of said other split portion of said latch member is insulated.

11. An acceleration switch comprising a supporting structure, a pair of contacts carried by said supporting structure and electrically insulated from one another, one of said contacts being movable relative to the supporting structure, an inertia mass movably carried by said supporting structure and being connected to said movable contact to actuate said contact to engage the other of said contacts when said inertial mass is displaced a predetermined amount, locking means for holding said contacts together after they have been in engagement with one another, releasing means for releasing said locking means to permit disengagement of said contacts, and contact pressure adjustment means to control displacement of one of said contacts.

12. An acceleration switch as set forth in claim 11, and wherein said contact pressure adjustment means is also an adjustment means of the movable contact for establishing the minimum acceleration force required to displace the inertial mass and the movable contact to close said contacts.

13. An acceleration switch comprising a supporting structure, a pair of contacts carried by said supporting structures and electrically insulated from one another, one of said contacts being movable relative to the supporting structure, an inertial mass carried by said supporting structure and connected to said movable contact to move said movable contact into engagement with the other of said contacts when said inertial mass is displaced a predetermined amount, locking means for locking said contacts together after they have been in engagement with one another, and releasing means for releasing said locking means to permit disengagement of said contacts, said releasing means permitting restoration of the movable contact to its normal condition by resilient action of the movable contact per se.

14. An omnidirectional acceleration switch as set forth in claim 1, where its contact means are normally open.

References Cited in the file of this patent

UNITED STATES PATENTS

| 2,236,872 | Grigsby | Apr. 1, 1941 |
| 2,833,878 | Dawson | May 6, 1958 |